(12) United States Patent
Alvarez et al.

(10) Patent No.: US 7,321,557 B1
(45) Date of Patent: Jan. 22, 2008

(54) DYNAMIC LATENCY ASSIGNMENT METHODOLOGY FOR BANDWIDTH OPTIMIZATION OF PACKET FLOWS

(75) Inventors: Tara Lynn Alvarez, Lafayette, NJ (US); Donald Edward Crowe, Morris Plains, NJ (US); Harold Shrage Fluss, West Orange, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 887 days.

(21) Appl. No.: 09/699,773

(22) Filed: Oct. 30, 2000

(51) Int. Cl.
*H04J 1/16* (2006.01)
*H04J 3/14* (2006.01)

(52) U.S. Cl. .................... 370/235; 370/493; 370/395.4

(58) Field of Classification Search ................ 370/229, 370/235, 276, 277, 278, 341, 342, 352–356, 370/470, 471, 468
See application file for complete search history.

(56) References Cited

U.S. PATENT DOCUMENTS

| | | | | |
|---|---|---|---|---|
| 4,100,377 A | * | 7/1978 | Flanagan ..................... | 370/435 |
| 4,317,195 A | * | 2/1982 | Barberis et al. ............ | 370/412 |
| 4,764,920 A | * | 8/1988 | Furuya ........................ | 370/437 |
| 5,497,371 A | * | 3/1996 | Ellis et al. .................. | 370/412 |
| 5,987,023 A | * | 11/1999 | Albrow et al. ............... | 370/350 |
| 6,031,846 A | * | 2/2000 | Gurusami et al. .......... | 370/508 |
| 6,205,125 B1 | * | 3/2001 | Proctor et al. .............. | 370/328 |
| 6,208,625 B1 | * | 3/2001 | Zancho et al. .............. | 370/316 |
| 6,430,196 B1 | * | 8/2002 | Baroudi ....................... | 370/466 |
| 6,466,548 B1 | * | 10/2002 | Fitzgerald .................... | 370/249 |
| 6,487,217 B1 | * | 11/2002 | Baroudi ....................... | 370/466 |
| 6,650,652 B1 | * | 11/2003 | Valencia ..................... | 370/433 |
| 6,662,330 B1 | * | 12/2003 | Hershey ..................... | 714/748 |
| 6,754,210 B1 | * | 6/2004 | Ofek .......................... | 370/389 |

FOREIGN PATENT DOCUMENTS

EP   0 777 363 A2   6/1997
WO   WO 00/07315   2/2000

OTHER PUBLICATIONS

XP-002188610, Database WPI, Section EI, Week 199841, Derwent Publications Ltd., Longon, GB; Class W01, AN 1998-473690, XP002188610 & JP 10 200581 A (Nippon Telegraph & telephone Corp), Jul. 31, 1998, Abstract.
Heywood, P., "Lan Switch Is Set to Take On Multimedia Ornet's LANbooster Ethernet Switch Delivers Fixed Latency For Delay-Sensitive Traffic", Data Communications, McGraw Hill, NY, vol. 23, No. 12, Sep. 01, 1994, pp. 64E-64F.

* cited by examiner

*Primary Examiner*—Chirag G. Shah

(57) ABSTRACT

A method and apparatus for transmitting delay sensitive information (DSI) and non-delay sensitive information (NDSI) over a communication link where initial DSI packets are delayed to reduce the number of conflicts between DSI and NDSI. The delay applied to the DSI is based on parameters such as the transmission periodicity of the DSI packets and the packet length of the NDSI being transmitted.

19 Claims, 3 Drawing Sheets

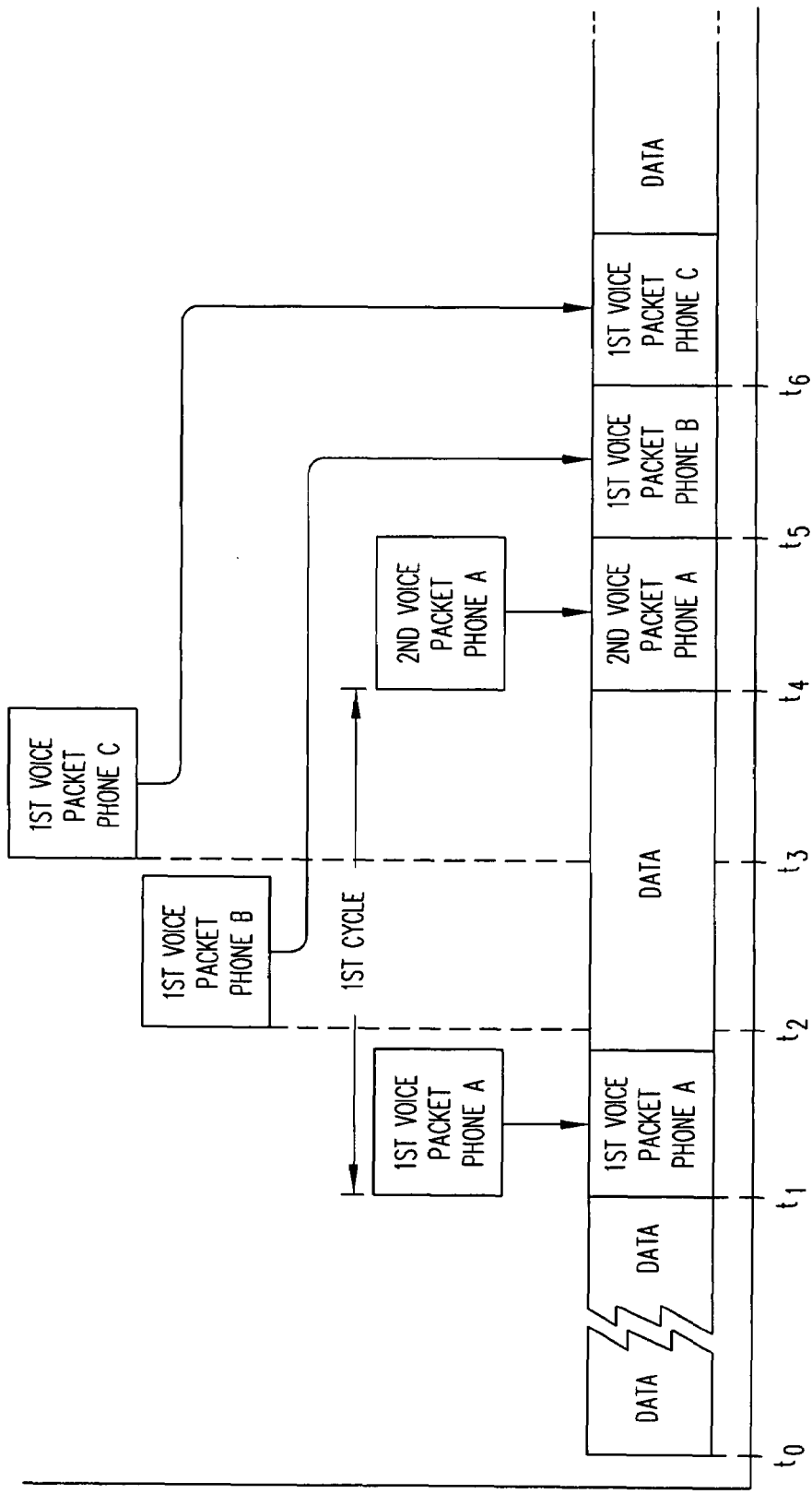

DYNAMIC LATENCY ASSIGNMENT METHODOLOGY FOR BANDWIDTH OPTIMIZATION OF PACKET FLOWS

RELATED APPLICATION

Related subject matter is disclosed in the following application concurrently filed herewith: U.S. patent application entitled "Dynamic Fragmentation of Information", Ser. No. 09/699,770, now U.S. Pat. No. 7,088,738.

BACKGROUND OF THE INVENTION

1. Field of the Invention

The present invention generally relates to the delaying of transmission of delay sensitive packets to improve the efficiency communication links over which such packets are transmitted.

2. Description of the Related Art

Due to an increase in information traffic in communication networks, many communication networks are evolving into packet-based networks in which packets are conveyed throughout the network based on various protocols. A protocol is a set of rules that dictates how communication is initiated, maintained and terminated between subscribers of the communication network. A packet is typically a block of information (e.g., block of bits) comprising header, payload and trailer portions. The header and trailer portions comprise signaling information, i.e., information that assists the network in forming, transmitting, receiving and rearranging of the packets. The payload is the actual information (i.e., subscriber information) being conveyed over the communication network from a point of origin to a destination point. A communication packet is routed based on signaling information contained in its header and trailer portions and the varying conditions in the network; there is not necessarily a dedicated route or channel for any packet or group of packets.

Older networks such as telephony networks are circuit based networks in which each particular communication channel is established and dedicated for communication between two or more points in a network. Circuit based networks, such as the Public Switched Telephone Network (PSTN), were traditionally used for voice communications, but such networks are now being converted to a packet based architecture. The packet based architecture allows different types of signals to traverse the links of a communication network. Due to the bursty nature of information packets, a packet-based architecture allows for more multiplexing which equates to higher efficiency of network resources.

One type of information that is exchanged between subscribers of a communication network is delay-sensitive information (DSI). Delay sensitive information is information in which there exists a strict timing relationship between consecutive packets and that any alteration in the timing of the packets causes distortion to occur when such packets are received at their destination. DSI also requires that the end-to-end delay is kept constant or is kept within certain defined bounds. End-to-end delay is the amount of time it takes a packet to traverse a network from an original point to a destination point. An example of DSI are packets representing voice signals. At the destination points, the voice packets should be received at a particular time such that they can be buffered to remove any added time gaps between any two consecutive packets of information. Any added time gap in the reception of DSI, such as voice packets, causes distortion to occur. The goal is for packets to be received at their destination points with their strict timing relationship maintained. In the case of voice packets, any additional time gaps may cause the resulting voice to become unintelligible to a listener. Another example of DSI is a stream of packets representing a video signal whereby any added time gaps in the reception of the stream of packets may cause the video signal to become distorted to a viewer.

Service providers, which are entities that own and control the communication equipment of the network, need to ensure the quality of service (QoS) for DSI. The QoS of a network depends on several network variables that affect, inter alia, the flow of packets in the network. To ensure an acceptable QoS, some of the network variables such as end-to-end delay, jitter and packet loss must be kept as low as possible. Jitter is the inconsistent latencies experienced by different packets propagating in a network. Packet loss is the number of packets that is irretrievably contaminated—for a defined period of time—due to errors in the header or payload, or due to buffer overflow or due to late arriving packets.

The bandwidths of the communication links of a packet based network are usually sufficient to allow such links to convey both DSI and non-delay sensitive information (NDSI) while maintaining an acceptable QoS for both types of information. The bandwidth of a link is related to the information rate of the link, i.e., the amount of information per unit time (usually measured in bits per second or bps) that can be exchanged through such link at any instant. When DSI has to be transmitted, it cannot be interrupted by other information. Many conflicts occur where a DSI packet has to be transmitted while an NDSI packet is being transmitted. In such cases, the NDSI transmission may be interrupted in favor of the DSI packet. The DSI packet is transmitted and the interrupted NDSI packet is subsequently retransmitted. As more conflicts occur, the number of retransmissions increases which tends to reduce the throughput or efficiency of the communication link over which the DSI and NDSI packets are being transmitted.

Internet Protocol (IP) networks, i.e., packet based networks based on the well known Internet Protocol have transmission media and network elements which operate at relatively high information rates. The network element typically found in an IP network is a router. A router is an interface between networks of an overall network such as the Internet. Routers are capable of exchanging relatively large amounts of information per unit time. Therefore, a common approach to satisfying the need for acceptable QoS for both DSI and NDSI is to over design a network making sure that the bandwidth of its links and routers is more than enough to handle both DSI and NDSI. In essence, the network will be operating at a utilization rate that is significantly lower for which it was designed.

A packet based communication or any communication network should ultimately be connected to its subscribers. The subscribers are connected to the communication network via access networks. The access networks are various types of communication equipment that interface subscribers to the communication network. The access network is connected to the packet based communication network through a network communication link. The access network is also connected to one or more subscribers via at least a second communication link, i.e, an access link. The bandwidth of the access links is typically much smaller than that of the network communication links. However, the service providers still want to provide the same type of QoS for the access links as for the links in the core of the packet based network. It is not economically feasible to simply increase the bandwidth of the access links because of the costs associated with replacing equipment and transmission media.

Another approach at ensuring acceptable QoS for DSI and NDSI is to apply priority queuing algorithms to the packets of information. Priority queuing is an algorithm whereby each packet arriving at the access network and destined for a subscriber connected to the access network is placed in a queue based on the type of information contained in the packet and the amount of information that is associated with the packet. The problem with queuing is that queuing by itself is insufficient. Additional techniques are usually needed to better manage the flow of packets into a queue or buffer.

Yet another approach at ensuring acceptable QoS for DSI and NDSI for access links (or relatively small bandwidth links) is to apply a fragmentation algorithm to the NDSI packets arriving at the access network. Fragmentation is the repackaging of the packets such that the length of each packet is changed. The packets are transmitted over the communication links of a packet based network in accordance with the well known Internet Protocol (IP) which is a layer 3 protocol. A layer 3 protocol is part of a hierarchy of protocols that are based on the Open System Interconnection (OSI) communications environment model developed by the International Standards Organization (ISO). The layer 3 protocol dictates which physical pathways (i.e., the routing) the packets should take based on network conditions (e.g., network congestion) and other factors such as network variables.

Traditionally, fragmentation is implemented with the use of a layer 2 protocol. The layer 2 protocol, which is also based on the OSI model, dictates how basic units of information (e.g., bits) are arranged to form basic blocks of information (e.g., packets), confirms that such blocks of information are properly placed in the proper communication channels and also confirms that these blocks of information arrive at their destination points without any errors. IP is said to be transported over a layer 2 protocol when any reformatting or repackaging of the blocks of information is done in accordance with the layer 2 protocol. Typically, the fragmentation algorithm repackages the NDSI packets into smaller packets to avoid conflicts with arriving DSI packets. NDSI packets can be interrupted during their transmission to accommodate for arriving DSI packets that have to be transmitted in accordance with strict timing requirements. An NDSI packet is simply retransmitted after its transmission was interrupted by an arriving DSI packet that had to be transmitted within a certain time period. The interruption and subsequent retransmission of NDSI caused by arriving DSI packets reduces the throughput of a communication link because less information is successfully conveyed over that link for a defined period of time. Thus, in a fragmentation algorithm an NDSI packet is fragmented into smaller sized packets in an attempt at reducing the number of conflicts between DSI and NDSI packets. The smaller size packets presumably can be transmitted with a relatively high likelihood that their transmission will not be interrupted by the need to transmit an arriving DSI packet.

One problem with the fragmentation algorithm is that many times the fragmentation is done in discord with varying network conditions. For example, NDSI packets can be fragmented to a certain size which may reduce the number of conflicts with DSI packets. However, that particular fragmentation size may not be appropriate at some later time because the network conditions (e.g., an increase in the number of DSI packets) have changed requiring that the NDSI packets be fragmented to a different size to maintain the reduced amount of conflicts. Another problem with fragmentation of IP packets transported over a layer 2 protocol is that, depending on the layer 2 protocol, much overhead is needed to implement the actual fragmentation. Additional information must be placed in the header and/or trailer of the packets such that the packets can be rearranged in their proper order when they arrive at their destination. The additional information added to the packets reduces the amount of information that can be stored in the packet payloads and thus reduces the throughput of the communication network. Also, because fragmenting of NDSI packets is done in accordance with layer 2 protocols, the level of fragmentation is limited to the processing of basic blocks of information defined by such protocols. Thus with layer 2 fragmentation, more finely tuned fragmentation cannot be achieved; this is another source of throughput reduction. For access links, the resulting throughput reduction is particularly damaging due to the already limited bandwidth of these links.

Yet another problem with fragmentation is that it does not take into account the conflicts that occur between arriving DSI packets. A DSI packet can arrive while another DSI packet is being transmitted. Both packets are time sensitive and should be transmitted in accordance with their timing requirements. There may be circumstances where a conflict between two DSI packets cannot be avoided resulting in distortion or error at the destination of the packets.

What is therefore needed is a method and apparatus for reducing the number of conflicts that occur when NDSI and DSI are transmitted over a communication links of relatively small bandwidth.

SUMMARY OF THE INVENTION

The present invention provides a method and apparatus for transmitting information in an efficient manner over a communication link. Particularly, the present invention provides a method and apparatus for transmitting, in an efficient manner, both DSI and NDSI over communication links of limited bandwidth. The method of the present invention substantially reduces the conflicts that occur between arriving DSI packets and between DSI and NDSI packets while at the same time increases the efficiency of NDSI transmissions.

In particular, the present invention provides a method where received information is identified as either DSI or NDSI. NDSI is transmitted in a non-fragmented manner while monitoring for the reception of any DSI. Upon reception of DSI, the method of the present invention determines whether the received DSI is an initial DSI. If the received DSI is an initial DSI, the method of the present invention applies a delay to the received DSI based on parameters of previously received DSI. Otherwise, the received DSI is transmitted in accordance with its timing requirements. In this manner, the method of the present invention tends to reduce the likelihood of conflicts between DSI and NDSI thus improving the throughput of the communication link over which the NDSI and DSI are being transmitted.

BRIEF DESCRIPTION OF THE DRAWINGS

FIG. 3 depicts a timing diagram of one particular execution of the method of the present invention.

DETAILED DESCRIPTION

The present invention provides a method and apparatus for transmitting information in an efficient manner over a communication link. Particularly, the present invention provides a method and apparatus for transmitting, in an efficient manner, both DSI and NDSI over communication links of limited bandwidth.

In particular, the present invention provides a method where received information is identified as either DSI or NDSI. NDSI is transmitted in a non-fragmented manner while monitoring for the reception of any DSI. Upon reception of DSI, the method of the present invention determines whether the received DSI is an initial DSI. If the received DSI is an initial DSI, the method of the present invention applies a delay to the received DSI based on parameters of previously received DSI. Otherwise, the received DSI is transmitted in accordance with its timing requirements. If an initial DSI is received during the transmission of another DSI, the received DSI is accordingly delayed as per the method of the present invention. In this manner, the method of the present invention tends to reduce the likelihood of conflicts between DSI packets and between DSI and NDSI packets thus improving the throughput of the communication link over which the NDSI and DSI are being transmitted. In sum, the apparatus and method of the present invention interleaves the transmission of DSI and NDSI so as to use the communication link in an efficient manner.

Figure 1:
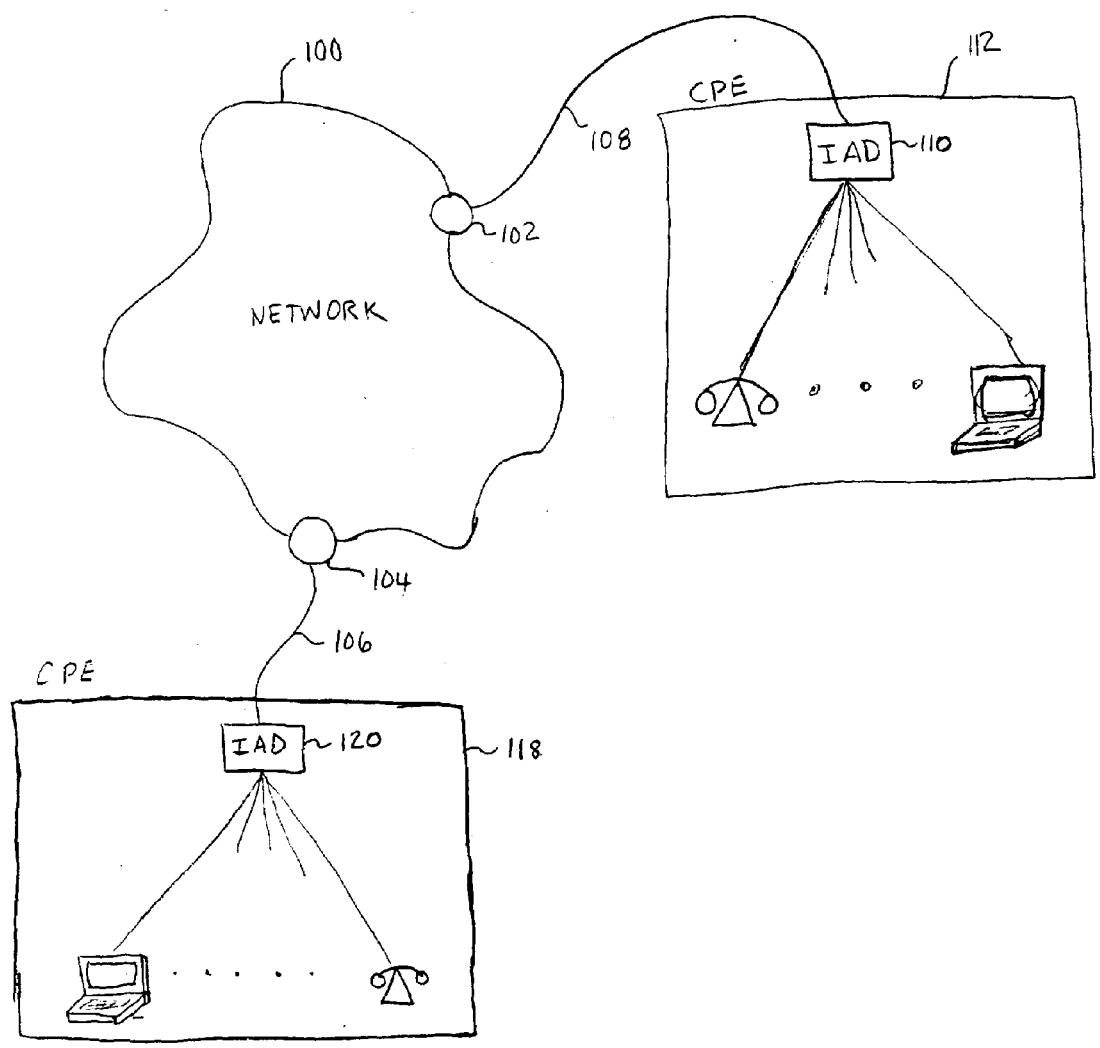
FIG. 1 depicts a packet based communication network coupled to two access networks.

Referring to FIG. 1, there is shown packet based communication network 100 having various access hosts (102, 104) at its edge. Hosts 102 and 104 are communication equipment that receive, transmit and process information that are destined for subscribers or destined for some node in the network. Hosts 102 and 104 are equipment that serve as interfaces between the access network and the core network (i.e., network 100). Examples of equipment represented by hosts 102 and 104 include Digital Subscriber Line Access Multiplexers (DSLAM) and Access Concentrators. Customer Premises Equipment (CPE) 118 and 112 are coupled to hosts 104 and 106 respectively via access links 106 and 108.

Typically, part of a CPE is an Integrated Access Device (IAD) that combines information from various subscriber equipment and transmits such information over an access link in accordance with a protocol being followed by the access network. Conversely, an IAD is also able to receive information from the access network and route such information to the proper subscriber equipment in accordance with the protocol of the access network. A CPE further comprises subscriber equipment such as a telephone, a facsimile machine and personal computer. It will be readily understood that hosts 102 and 104, CPE 112 and 118 and access links 106 and 108 are shown for illustrative purposes only and that a network such as network 100 is usually connected to more than two access networks.

Figure 2:
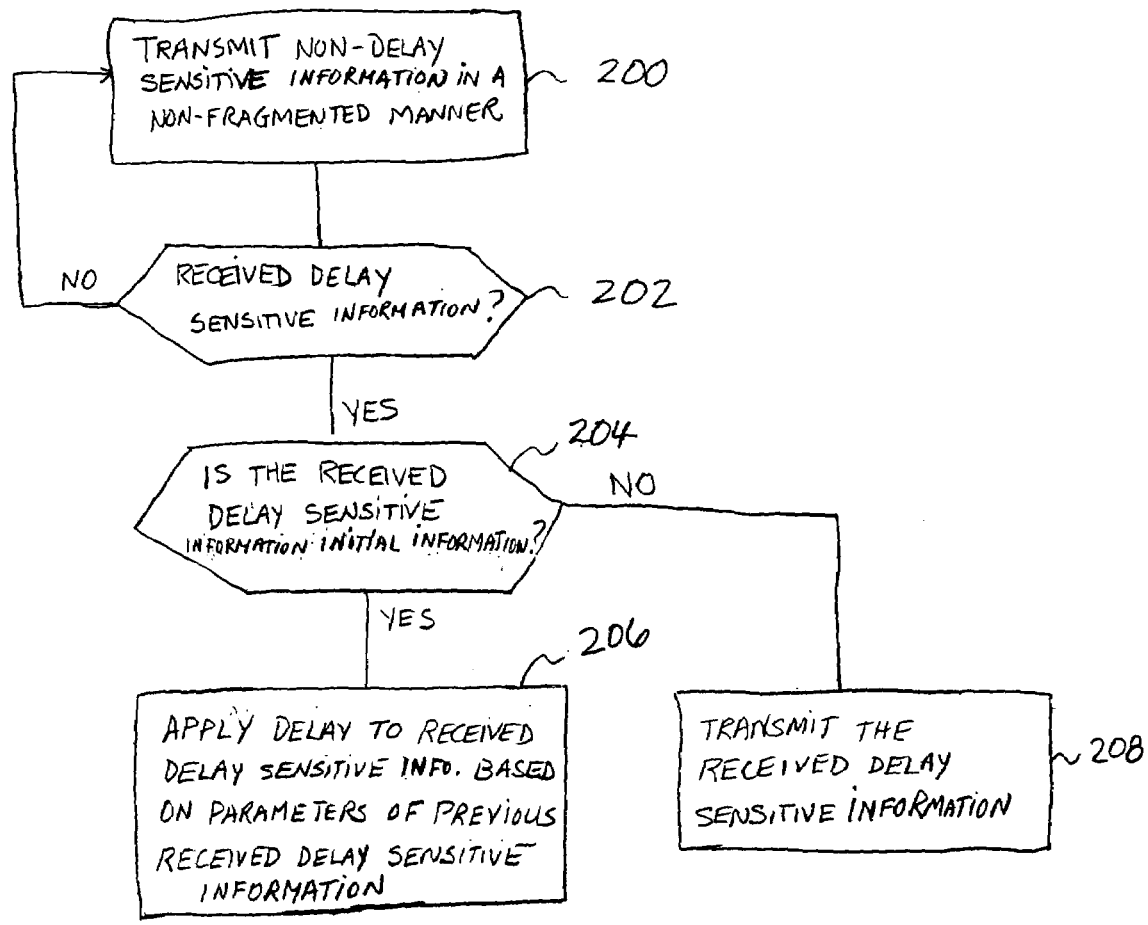
FIG. 2 depicts the method of the present invention.

Referring now to FIG. 2, there is shown the method of the present invention which can be implemented at an IAD and/or at a host as shown in FIG. 1. It should be noted, however, that the method of the present invention can also be implemented at any node of a packet based network. A node is any particular point in the network comprising communication equipment that transmit, process and receive information being conveyed over the network. The method of the present invention can be explained from the point of view of either a host or an IAD. For ease of explanation, the method of the present invention is explained from the standpoint of an IAD.

Suppose that initially IAD 120 is transmitting NDSI to host 104. In step 200 of the method of the present invention, IAD 120 transmits the NDSI over access link 106 in a non-fragmented manner. In other words, the NDSI is transmitted continuously or in relatively long packets for as long as possible. The non-fragmented transmission of NDSI represents an efficient use of access link 106 because the continuous transmission of information allows very little or no time gaps in the transmission. The non-fragmented transmission of information is implemented with the use of buffers that temporarily store arriving NDSI and rearrange such information so that it is transmitted with relatively little or no time gaps.

In step 202, while transmitting only NDSI, IAD 120 is monitoring the changing state (e.g., ON HOOK/OFF HOOK) of the subscriber equipment as well as monitoring data packets from other CPEs such as PCs to determine if any DSI flows are being initiated or terminated. IAD 120 can apply any one of various techniques to monitor packets. For example, IAD 120 can monitor in a periodic manner, in a continuous manner or in an aperiodic manner. IAD 120 determines whether a packet is DSI based on header information formatted in accordance with a higher layer protocol (e.g., layer 4 of the OSI model). IAD further can determine whether a DSI packet is an initial packet or a last packet based on the changing state of subscriber equipment. For example, after a phone changes state from OFF HOOK to ON HOOK, IAD 120 is aware that no more packets are to be transmitted for that phone. Conversely, a phone changing state from ON HOOK to OFF HOOK is an indication that the next packet is an initial packet from that subscriber equipment. An initial packet is thus the first packet carrying subscriber information that is generated. NDSI packets have information in their headers that inform IAD 120 (or any other communication node) the length of the information being transmitted.

Information about the timing relationship between any two consecutive packets is derived by IAD 120 based on the characteristic of the signal that such packets represent. In particular, IAD 120 generates the packets for various subscriber equipment connected thereto. For example, voice signals are typically sampled at a rate of 8 KHz (8000 samples per second) meaning that a sample is generated every 125 μsec. Each sample, or a group of samples, is converted to a DSI packet and queued for transmission by IAD 120. Each such DSI packet should be transmitted by IAD 120 at the appropriate multiple of 125 μsec to maintain the necessary timing relationship between packets. The samples or groups of samples are said to have a periodicity of 125 μsec. The periodicity is therefore the basic timing relationship between consecutive packets or group of packets. Other DSI signals (e.g., video) from various subscriber equipment are also sampled and thus such signals are transmitted to IAD 120 in accordance with strict timing relationships between consecutive packets. It should be noted that the IAD will generate the packets for subscriber equipment such as traditional telephones or facsimile machines. Other subscriber equipment such as computers generate the packets themselves, but the IAD still contains the intelligence to fragment (e.g., dynamically fragment) NDSI and assign latency requirements for DSI as per the method of the present invention.

Upon reception of a DSI packet from subscriber equipment, or generation of the DSI packet as described, the method of the present invention moves to step 204. In step 204, IAD 120 determines whether the received DSI is initial information; i.e., whether the received packet is the very first packet of a stream of packets to be transmitted by a particular subscriber. If the received packet is not an initial packet, the method of the present invention moves to step 208. In step 208, the received DSI is transmitted as per its timing requirement, which may require the fragmentation of NDSI being transmitted or the fragmentation of NDSI to be transmitted.

If, however, the received packet is an initial DSI packet, the method of the present invention moves to step 206 where the transmission of the DSI is delayed based on the parameters of active DSI flows; active DSI flows are DSI packets currently being received by IAD 120. In other words, IAD 120 knows that another DSI packet that is part of the same information as this initial DSI packet is to be transmitted at a particular time to maintain the timing relationship between the packets. The method of the present invention, however, is able to apply a certain amount of delay to such an initial packet where the delay is such that it will not cause any detectable distortion of the information being carried by the DSI packets. The applied delay will be partially based on the periodicity of previously received DSI. The selection of a transmission time for an initial DSI packet having a certain periodicity is referred to as establishing a time of transmission. Each transmitted DSI packet also contains information in its header about the length of the DSI packet. The delay applied to the transmitted DSI is also based on the length of the transmitted DSI packet and other information stored in the header of the DSI packet. IAD 120 maintains a list of transmission times of received initial DSI packets and assigns the currently transmitted DSI packet to an available time of transmission that does not conflict with any already established times of transmission. In this manner, a string of DSI packets are transmitted consecutively thus reducing the number of conflicts that occur between the DSI packets and between DSI and NDSI packets being transmitted over link 106.

Referring now to FIG. 3, a particular example of the application of the method of the present invention is shown. The transmitted DSI packets are voice signals from different telephone conversations. At time $t_0$, NDSI is being transmitted in a non-fragmented manner. At time $t_1$, an initial DSI packet associated with a particular subscriber (i.e., phone A goes OFF HOOK) is received. The method of the present invention first determines whether that voice packet is indeed an initial packet and then determines the periodicity of this received packet. The method of the present invention then determines if the NDSI being transmitted is near its end. The header of all NDSI packets contains information that defines the length or explicitly state the length of the NDSI packet being transmitted. If the voice packet from phone A can be delayed to allow the NDSI transmission to be completed where the delay is relatively small, then the initial voice packet from phone A will be delayed accordingly. Otherwise, if the delay is appreciable, the initial voice packet from phone A is transmitted and the NDSI is fragmented.

For the application being discussed, the NDSI is fragmented to allow for the transmission of the initial voice packet from phone A. The transmission of NDSI is thus terminated. It should be noted that the NDSI is preferably fragmented based on various parameters of received DSI information and the fragmentation is performed at the network layer protocol as discussed in a concurrently filed invention entitled "Dynamic Fragmentation of Information", Ser. No. 09/699,770. Dynamic fragmentation is based on parameters such as sample rate, information compression, amount of information, number of channels included in the DSI, and amount of information per channel included in the DSI. Different DSI are typically grouped together wherein each packet represents a flow of DSI associated with a particular subscriber equipment. Each such flow of DSI is thus regarded as a channel. The overhead information are the information stored in the header and/or trailer of the packets. Each packet in a packet flow is given a particular size; for example a packets flow may contain N bytes of information, where N is an integer equal to 1 or greater. Many times, the information in a packet flow is compressed to improve efficiency. Thus, there is a particular compression factor, L, associated with each channel; for each block of J bits of information, the block is compressed by a factor L such that J bits become J/L bits where J and L are integers equal to 1 or greater. For each arriving initial DSI packet, a fragmentation calculation is performed at the network layer for NDSI and such calculation is based on the aforementioned parameters. Thus, the result of each fragmentation calculation is stored in a list. The most restrictive fragmentation result (e.g., shortest NDSI length) is selected as the fragmentation to be implemented. It will be appreciated that other methods of fragmentation can also be implemented for the method of the present invention. Possible retransmission of interrupted NDSI is mediated by higher layer protocols (i.e., layer 4 the OSI model).

After transmission of the initial voice packet from phone A is completed, the transmission of the fragmented NDSI is performed. However, at some later time, $t_2$, during the transmission of the fragmented NDSI, an initial voice packet from phone B is received. The method of the present invention determines the periodicity of that initial voice packet from phone B and also determines a new packet length of the fragmented NDSI; this new length will be applied to the very next NDSI to be transmitted. The new length, which is based on various methods, is calculated for every initial packet received. As previously described, the new length can be calculated based on various parameters of the received DSI such that the NDSI is dynamically fragmented. The fragmentation is done at a network layer protocol (e.g., layer 3 of the OSI model). The method of the present invention assigns a delay to the initial voice packet from phone B to prevent a conflict between the NDSI being transmitted as well as a conflict with other arriving DSI's. A conflict occurs when there is full or partial overlap in the transmission of at least two distinct packets. The packets can be DSI, NDSI or a combination thereof. The delay is not only based on the periodicity of an initial DSI, but is also based on the information length of the NDSI resulting from a fragmentation operation such as dynamic fragmentation. In this manner, the retransmitted NDSI need not be interrupted and fragmented once again.

At some time, $t_3$ later another initial voice packet (from phone C) is received. The method of the present invention again calculates a new packet length for the NDSI that will be transmitted. The method of the present invention assigns a delay to the voice packet from phone C to allow the packet to be transmitted during the first available time $t_6$. It should be noted that the first available time could have been time $t_4$ or $t_5$ if for some reason the phone conversations of phone A or phone B were terminated prior to or at the time of arrival of the initial voice packet from phone C. In this manner, the number of conflicts between DSI and NDSI or between DSI's is reduced so that communication link 106 is used more efficiently by IAD 120. Also the number of fragmentations performed per periodicity is reduced. As a result of reducing the number of fragmentations, the processing and the overhead associated with fragmentation operations are also reduced.

As previously stated the method of the present invention can also be implemented at a host. Suppose, for example, host 104 is transmitting NDSI and DSI information to CPE 118 over communication link 106. Host 104 would apply the method of the present invention in the same manner as implemented by IAD 120. Host 104 would calculate a new fragmentation requirement for each initial DSI it receives from packet based network 100. As previously discussed, the fragmentation calculation is based on parameters of the arriving DSI packet and is packaged at a network layer. The parameters are stored in the header and/or trailer of the arriving DSI packet. Host 104 can determine whether an arriving DSI packet is an initial packet or a last packet based on information provided by IAD 120. In other words, an arriving packet determined to be a DSI packet by Host 104 is transmitted to IAD 120 over communication link 106. IAD 120 determines that such an arriving packet is an initial packet based on the changing state of the destination subscriber equipment and also determines the periodicity of associated packets from the characteristics of the destination subscriber equipment. IAD 120 transmits the periodicity information and the initial packet information to Host 104 advising Host 104 that the packet was an initial DSI packet having a periodicity of a particular value. Host 104 subsequently transmits associated packets (over link 106) in accordance with the periodicity. Host 104 also receives information from IAD 120 when a subscriber equipment terminates communications. The resulting last packet is identified by IAD 120 which transmits a message over link 106 to Host 104 identifying the packet as a last packet; this allows Host 104 to update its list of transmission times that allow the packets to be transmitted so as to reduce the number of conflicts.

The apparatus of the present invention can be implemented with digital and/or analog circuitry, digital processors and microprocessor based circuitry that operate in accordance with programmed instruction such as high level software and/or firmware. Any of the aforementioned embodiments of the apparatus of the present invention is configured to transmit DSI and NDSI so as to reduce the number of conflicts that occur between such information. In sum, the apparatus of the present invention is configured to transmit DSI packets based on the periodicity of previously received DSI packets and on the length of any NDSI being transmitted when a DSI is received. The apparatus of the present invention can be part of any node of a communication network (including host equipment) or can be part of an IAD located at or nearby a CPE. Further, the method of the present invention is implemented as software and/or firmware that operate various communication equipment of a communication network.

We claim:

1. A method for transmitting delay sensitive information (DSI) over a communication link of a communication network, the method comprising the steps of:
   transmitting an initial DSI after applying a delay to the initial DSI where such delay is based on a determined periodicity of received DSI, the periodicity being a function of a sampling rate used to form the received DSI.

2. The method of claim 1, comprising transmitting non-delay sensitive information (NDSI) over the link of the communication network, wherein the delay is further based on a defined length of the NDSI being transmitted.

3. A method for transmitting delay sensitive information (DSI) over a communication link of a communication network, the method comprising the steps of:
   transmitting an initial DSI after applying a delay to the initial DSI where such delay is based on a determined periodicity of received DSI, wherein the step of transmitting DSI comprises:
   transmitting NDSI in a non-fragmented manner when there are no DSI to be transmitted;
   monitoring for any received DSI;
   determining whether the received DSI is an initial DSI;
   transmitting the received DSI based on periodicity associated therewith when such received DSI is not an initial DSI; and
   performing a fragmentation operation for non-delay sensitive information (NDSI) to be transmitted or for NDSI being transmitted.

4. The method of claim 3 wherein the fragmentation operation performed is a dynamic fragmentation operation.

5. The method of claim 3, wherein the step of determining whether a received DSI is an initial DSI is based on information received from communication equipment.

6. The method of claim 3, wherein the step of transmitting the DSI based on periodicity associated therewith is based on information received from communication equipment.

7. The method of claim 5, wherein the communication equipment is an integrated access device (IAD).

8. The method of claim 5, wherein the communication equipment is subscriber equipment.

9. The method of claim 6 wherein the communication equipment is an integrated access device (IAD).

10. The method of claim 6, wherein the communication equipment is subscriber equipment.

11. The method of claim 1 further comprising the steps of:
    maintaining a list of transmission times for received initial DSI;
    establishing a transmission time for each received initial DSI; and
    updating the list when an initial DSI is received or when a DSI flow is terminated.

12. An apparatus for transmitting delay sensitive information (DSI) and non-delay sensitive information (NDSI) over a communication link of a communication network, wherein the apparatus applies a delay to received initial DSI based on a determined periodicity of the initial received DSI and a defined length of NDSI being transmitted, the periodicity being a function of a sampling rate used to form the initial received DSI.

13. The apparatus of claim 12 configured as an integrated access device (IAD) coupled to subscriber equipment and to an access network.

14. The apparatus of claim 12 configured as part of host equipment, wherein such host equipment is coupled to an access network and to a packet based communication network.

15. A method for delaying of transmission of a set of packets associated with a packet flow, the method comprising:
    identifying information associated with at least one packet of the set as at least one of delay sensitive information (DSI) or non-delay sensitive information (NDSI);
    determining whether the received DSI is an initial DSI; and
    applying a delay to the DSI based on a periodicity associated with a previously received DSI of the packet and the packet length of the NDSI being transmitted, the periodicity being a function of a sampling rate used to form the previously received DSI.

16. A method, as set forth in claim 15, wherein selectively applying a delay further comprises:

in response to determining that the received DSI is the initial DSI, transmitting the received DSI based on a transmission periodicity of a DSI packet in the set of packets.

17. A method, as set forth in claim 16, further comprising:
in response to determining that the received DSI is not the initial DSI, transmitting the NDSI after applying the delay to the DSI.

18. A method, as set forth in claim 17, further comprising:
transmitting the DSI over a communication link of a communication network.

19. A method, as set forth in claim 18, further comprising:
transmitting both the DSI and NDSI over the communication link.

* * * * *